(12) United States Patent
Nelson et al.

(10) Patent No.: US 8,411,764 B2
(45) Date of Patent: Apr. 2, 2013

(54) SYSTEM AND METHOD FOR MULTI-PROTOCOL RADIO-FREQUENCY IDENTIFICATION

(75) Inventors: Christopher J. Nelson, Cupertino, CA (US); Kirk B. Bierach, Saratoga, CA (US)

(73) Assignee: Farpointe Data, Inc., Sunnyvale, CA (US)

( * ) Notice: Subject to any disclaimer, the term of this patent is extended or adjusted under 35 U.S.C. 154(b) by 791 days.

(21) Appl. No.: 11/893,679

(22) Filed: Aug. 16, 2007

(65) Prior Publication Data

US 2009/0045921 A1 Feb. 19, 2009

(51) Int. Cl.
*H04Q 5/22* (2006.01)

(52) U.S. Cl. ............... 375/259; 340/539.11; 340/572.1; 340/10.5

(58) Field of Classification Search .............. 375/259, 375/377; 340/539.11, 572.1, 10.5, 10.33, 340/10.1, 10.2, 10.3, 10.34, 10.41, 10.51, 340/8.1; 455/41.1
See application file for complete search history.

(56) References Cited

U.S. PATENT DOCUMENTS

| | | | |
|---|---|---|---|
| 4,333,072 A | 6/1982 | Beigel | |
| 4,425,645 A | 1/1984 | Weaver et al. | |
| 4,519,068 A | 5/1985 | Krebs et al. | |
| 5,041,826 A | 8/1991 | Milheiser | |
| 5,050,150 A | 9/1991 | Ikeda | |
| 5,343,469 A | 8/1994 | Ohshima | |
| 5,347,263 A | 9/1994 | Carroll et al. | |
| 5,594,384 A | 1/1997 | Carroll et al. | |
| 5,600,683 A | 2/1997 | Bierach et al. | |
| 5,909,462 A | 6/1999 | Kamerman et al. | |
| 5,952,935 A | 9/1999 | Mejia et al. | |
| 6,154,136 A * | 11/2000 | Van Eeden | 340/572.1 |
| 6,212,175 B1 | 4/2001 | Harsch | |
| 6,285,681 B1 | 9/2001 | Kolze et al. | |
| 6,307,517 B1 | 10/2001 | Lee | |
| 6,367,697 B1 | 4/2002 | Turner et al. | |
| 6,369,693 B1 | 4/2002 | Gibson | |
| 6,377,176 B1 | 4/2002 | Lee | |
| 6,411,199 B1 * | 6/2002 | Geiszler et al. | 340/10.1 |

(Continued)

FOREIGN PATENT DOCUMENTS

| | | |
|---|---|---|
| JP | 2004227314 | 8/2004 |
| WO | 02/41650 | 5/2002 |

(Continued)

OTHER PUBLICATIONS

Yohei Fukumizu, Shuji Ohno, Makoto Nagata, and Kazuo Taki, "Communication Scheme for a Highly Collision-Resistive RFID System", Japan, IEICE, Feb. 2006.*

(Continued)

*Primary Examiner* — Aristocrats Fotakis
(74) *Attorney, Agent, or Firm* — Nixon Peabody LLP

(57) ABSTRACT

A system and method for communicating with contactless IC cards of multiple protocols includes transmitting an IC card polling signal and receiving a data transmission from an IC card. A processor is configured to determine whether or not a data transmission is received in response to the polling signal. The processor is configured to decode the data transmission in real-time if it is received in response to the polling signal. The processor is otherwise configured to first store the received data transmission in a memory and then decode the stored data transmission.

32 Claims, 5 Drawing Sheets

U.S. PATENT DOCUMENTS

| | | | |
|---|---|---|---|
| 6,963,270 | B1 | 11/2005 | Gallagher, III et al. |
| 7,652,556 | B2 * | 1/2010 | Breitfuss et al. ............. 340/10.1 |
| 2004/0203462 | A1 | 10/2004 | Lin et al. |
| 2005/0156709 | A1 * | 7/2005 | Gilbert et al. ................ 340/10.1 |
| 2005/0156723 | A1 | 7/2005 | Fujii |
| 2006/0117066 | A1 * | 6/2006 | Smith et al. ................ 707/104.1 |
| 2006/0119470 | A1 * | 6/2006 | Breitfuss et al. ............. 340/10.1 |
| 2006/0125605 | A1 * | 6/2006 | Fischer et al. ............. 340/10.41 |
| 2006/0176152 | A1 | 8/2006 | Wagner et al. |
| 2006/0220790 | A1 * | 10/2006 | Doi et al. ..................... 340/10.2 |
| 2006/0220791 | A1 | 10/2006 | Willins et al. |
| 2006/0289649 | A1 | 12/2006 | Sugiura et al. |
| 2007/0018793 | A1 * | 1/2007 | Stewart et al. ............... 340/10.3 |
| 2007/0096876 | A1 * | 5/2007 | Bridgelall et al. ........... 340/10.1 |
| 2008/0061936 | A1 * | 3/2008 | Park ............................. 340/10.1 |
| 2008/0068174 | A1 | 3/2008 | Al-Mahdawi |
| 2008/0204194 | A1 * | 8/2008 | Haar et al. ................... 340/10.1 |
| 2009/0002176 | A1 | 1/2009 | Bekritstky et al. |
| 2009/0045913 | A1 | 2/2009 | Nelson et al. |
| 2009/0045923 | A1 * | 2/2009 | van Eeden ................... 340/10.3 |

FOREIGN PATENT DOCUMENTS

| | | |
|---|---|---|
| WO | 2004/063971 | 7/2004 |
| WO | 2006/104338 A1 | 10/2006 |
| WO | 2006/109212 | 10/2006 |

OTHER PUBLICATIONS

Kobayashi,S., Sakamura,K., Morokuma,T., "A Dynamic Retargettable Multi-Protocol RFID Reader/Writer", Tokyo, Japan, May 2007, IEEE.*
International Search Report and Written Opinion for International Application No. PCT/US2008/071072, date mailed Oct. 27, 2008.
van Eeden, Hendrik, "'Reader Talks First' vs. 'Tag Talks First' RFID protocols", white paper, retrieved from the internet, URL: http://www.ipico.co.za/technology/Whitepapers/TTF%20white%20paper%20v5.pdf, retrieved on Nov. 8, 2006.
International Search Report and Written Opinion for International Application No. PCT/EP2008/071084 (Nov. 18, 2008).
Beigel, Michael L., "Objective Measurements for RF-ID System Performance: System Design and Evaluation Criteria", (Jan. 16, 1993).
Motorola Indala Corporation, "Installation and Operation Instructions", PR-10 Manual (Jul. 8, 1994).
Swatch Datasheet, "Read-Only Contactless Identification Device", EM Microelectronic-Marin SA (Mar. 1996).
SIA, "Access Control Standard Protocol for the 26-BIT Weigand™ Reader Interface" (Oct. 17, 1996).
Motorola,"RFID: Everything You Need to Know" (Nov. 11, 1997).
Microchip AN678, "RFID Coil Design", © Microchip Technology Inc. (Jan. 1, 1998).
Microchip AN680, "Passive RFID Basics", Microchip Technology Inc. (Jan. 1, 1998).
Microchip, "FSK Reader Reference Design", Microchip Technology Inc. (Jan. 1, 1998).
Beigel, Michael L., "Dynamic Performance of Passive-Tag Inductive RFID Systems", Transponder News (Feb. 21, 1999).
Motorola, "The ProxSmith™ System User Manual" (Apr. 15, 1999).
Microchip MCRF250 Data Sheet, "125 kHz microID® Passive RFID Device with Anti-Collision" (2005).
Microchip White Paper, "microID™ 125 kHz RFID System Design Guide" (Dec. 1998).
Wikipedia, definition of "Checksum", URL: http://en.wikipedia.org/wiki/Checksum (2008).
© IDTechEx White Paper, "RFID Explained", Website: www.idtechex.com (2005).
Office Action in U.S. Appl. No. 11/893,678, mailed Dec. 10, 2010.
Office Action in U.S. Appl. No. 11/893,678, mailed May 5, 2011.
Office Action in U.S. Appl. No. 11/893,678, mailed Jan. 6, 2012.
Office Action in U.S. Appl. No. 11/893,678, mailed Jun. 28, 2012.

* cited by examiner

SYSTEM AND METHOD FOR MULTI-PROTOCOL RADIO-FREQUENCY IDENTIFICATION

STATEMENT OF RELATED APPLICATIONS

The present application may be considered to be related to co-pending U.S. patent application Ser. No. 11/893,678 filed on even date herewith, in the name of inventor Christopher P. Nelson and Scott E. Lindley, entitled "System And Method For Interrogation Radio-Frequency Identification", commonly owned herewith.

TECHNICAL FIELD

The present disclosure relates generally to radio-frequency identification (RFID) technology and more specifically to a multi-protocol RFID interrogator.

BACKGROUND

The development of RFID systems has been fueled by advances in integrated circuit (IC) technology, which enables significant miniaturization of electronic devices, and recent growth in the popularity of wireless communications, which provides a secure and reliable way for transferring information using RF signals. Typically, an RFID system includes an RFID interrogator (or reader) and one or more RFID tags (or contactless IC cards). In operation, the RFID interrogator generates an alternating magnetic field, which induces electric current in a proximate RFID tag. The induced electric current provides enough power to the RFID tag to transmit a response signal to the RFID interrogator.

Due to relative simplicity and low cost of manufacturing, RFID systems have gained a widespread application. For example, RFID technology is commonly used for personal authentication in passports and other forms of ID. In the transportation sector, RFID cards are used to pay for the use of public transportation and highways. In the retail environment, RFID tags are used for product tracking. In the banking industry, RFID technology is embedded in debit and credit cards. In security applications, RFID cards are used to access secure areas or services. In medicine, RFID technology is used in human implants to monitor various health conditions, monitor prescribed drugs and the like.

The growing demand for RFID products has resulted in development of numerous proprietary and non-proprietary RFID technologies. The proprietary nature of some of these technologies often makes them incompatible with each other. For example, RFID systems manufactured by different vendors may use custom communication protocols and data formats and have different power requirements. Despite industry-wide efforts to standardize RFID technologies, there remain numerous incompatible RFID systems. Accordingly, there is a need for an RFID interrogator interoperable with various RFID tags, which may have different protocols, data formats and power requirements.

OVERVIEW

Disclosed are a radio-frequency identification method and system interoperable with disparate RFID communication protocols, data formats and power requirements. In one example embodiment, an IC card reader, such as RFID interrogator, includes a transmitter configured to transmit an IC card polling signal, a receiver configured to receive a data transmission from an IC card, a memory configured to store the detected data transmission and a processor configured to process the received data transmission. The processor may be configured to determine whether the data transmission is being received in response to the polling signal. Accordingly, if the data transmission is being received in response to the polling signal, the processor may be configured to decode in real-time the data transmission being received. If the data transmission is not being received in response to the polling signal, the processor may be configured to store the received data transmission in a memory and to decode the stored data.

To determine whether or not the data transmission is being received in response to the polling signal, the processor may be configured to determine whether the data transmission is received before or after expiration of a predefined time period following transmission of the polling signal according to one example embodiment. In order to decode the stored data transmission, the processor may be configured to determine a format of the data transmission. The format of the data transmission may, in one embodiment, be determined in the following manner: the processor determines whether data transmission includes one or more start bits; the processor determines whether the data transmission includes one or more parity bits; and the processor determines whether the data transmission includes one or more cyclic redundancy check (CRC) bits.

In order to determine whether the data transmission includes one or more start bits, the processor may be configured to determine the total number of bits in the data transmission, and whether the total number of bits in the data transmission is divisible without remainder by at least one of a first integer and a second integer. Having determined presence of the start bits, the processor is configured to remove the start bits from the data transmission. The processor then determines whether the data transmission includes one or more parity bits by determining whether the total number of bits in the data transmission, less the one or more start bits, is divisible without a remainder by at least one of the first integer and the second integer. In one exemplary embodiment, the first integer may be eight (8) and the second integer may be nine (9).

The processor may be further configured to determine, based on the values of one or more parity bits, a parity of the data transmission, the parity including one of even parity and odd parity. The processor may be further configured to detect any errors in the data transmission, based on the parity of the data transmission and the values of the one or more parity bits in the data transmission. Having determined that a data transmission does not contain any errors, the processor may remove the one or more parity bits from the data transmission. When the processor detects one or more errors in the data transmission, the processing of the data transmission may be terminated and stored data may be deleted from the memory. The IC card reader may then await the reception of another data transmission from one or more proximate IC cards.

Once one or more parity bits are removed, the processor may be configured to determine whether the data transmission includes one or more cyclic redundancy check (CRC) bits. If the data transmission includes such CRC bits, the processor performs a cyclic redundancy check of the stored data transmission and removes the one or more CRC bits from the data transmission when the cyclic redundancy check is completed and no errors are detected. The remaining bits in the data transmission are considered to be data bits, which are processed accordingly. If during cyclic redundancy check the processor detects an error in the data transmission which cannot be corrected, the processing of the data transmission may be terminated. The IC card reader may then be configured to enter a polling mode or await the reception of another data transmission from one or more proximate IC cards.

In another example embodiment, a programmable integrated circuit (IC) device for facilitating communication with a contactless IC card, such as RFID tag, includes program logic for generating a bit sequence for transmission as a polling signal to an IC card. The IC device further includes program logic for receiving a bit sequence generated from a data transmission from an IC card and determining whether or not the data transmission is being received in response to the polling signal. The IC device further comprises program logic for decoding in real-time the bit sequence being received when the data transmission is being received in response to the polling signal. The IC device further comprises program logic for storing the received bit sequence in a memory and decoding the stored bit sequence when the data transmission is not being received in response to the polling signal. In one example embodiment, the IC device may include a general purpose processor, a microcontroller, a field programmable gate array, or an application-specific integrated circuit (ASIC) to accomplish execution of the programmed logic.

In yet another example embodiment, a method for communicating with a contactless IC card comprises transmitting an IC card polling signal and receiving a data transmission from an IC card. The method further comprises determining whether or not the data transmission is being received in response to the polling signal. If the data transmission is being received in response to the polling signal, decoding in real-time the data transmission being received. If the data transmission is not being received in response to the polling signal, storing the received data transmission in a memory and decoding the stored data transmission. The method further comprises determining whether or not the data transmission is being received in response to the polling signal and comprises determining whether the data transmission is received before or after expiration of a first time period following transmission of the polling signal. The method further comprises retransmitting the polling signal after expiration of a second time period, the second time period being longer than the first time period.

In yet another embodiment, a computer-readable medium comprising computer-executable instructions for configuring operation of a contactless IC card interrogator, such as instructions for selecting an operating mode of the IC card interrogator. The operating mode may be selected from a group of operating modes including: a first operating mode, wherein the IC card interrogator initiates communication with proximate IC cards by periodically transmitting an IC card polling signal; a second operating mode, wherein an IC card interrogator listens for communications initiated by proximate IC cards; and a third operating mode, wherein the IC card interrogator periodically alternates between the first operating mode and the second operating mode. The medium may also include instructions for configuring duration of the first operating mode and duration of the second operating mode when the third operating mode is selected. In addition, the medium may include instructions for retrieving from the interrogator information communicated by an IC card, decoding the retrieved information and displaying the decoded information in human-readable form.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of an RFID communication system. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

Figure 1:
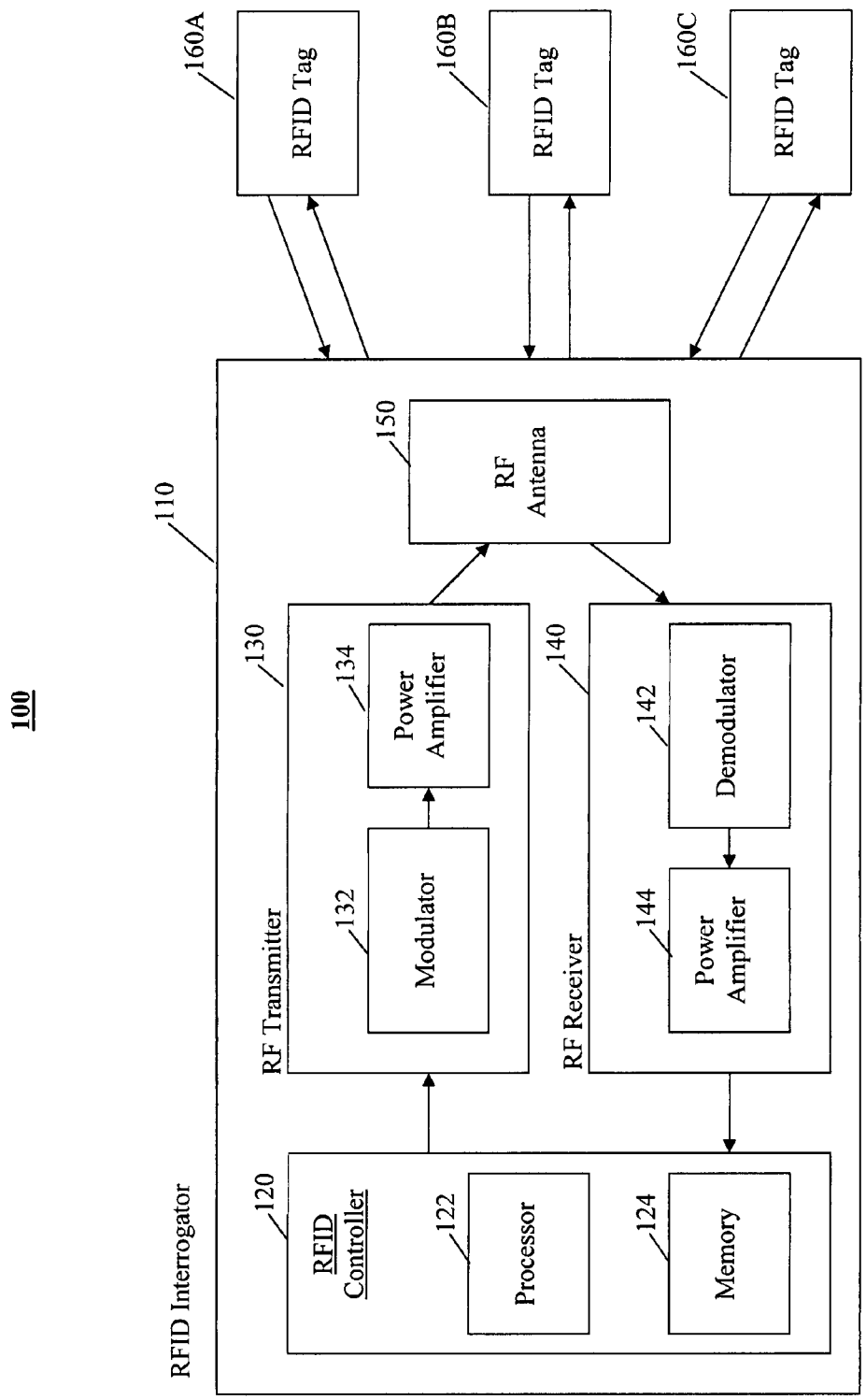
FIG. 1 is a block diagram illustrating an example embodiment of an RFID system.

Turning now to FIG. 1, a block diagram of one example embodiment of an RFID system 100 is shown. The RFID system 100 includes RFID interrogator 110 and a plurality of RFID tags 160 (160A, 160B, 160C). The RFID interrogator 110 includes an RFID controller 120, which includes a processor 122 and memory 124. The interrogator 110 further includes RF transmitter 130, which includes a modulator 132 and power amplifier 134. The interrogator 110 further includes an RF receiver 140, which includes a demodulator 142 and power amplifier 144. The interrogator further includes one or more RF antennas 150. The diagram has been simplified to include primarily elements of the system 100 that will be relevant to the discussion that follows. Those of ordinary skill in the art will readily identify other elements that might also be included as desired or required. The various elements may be also separated, combined or reordered as desired or required. Other means of implementing the interrogator are also known to those of skill in the art and are not intended to be excluded.

In one example embodiment, an interrogator 110 includes an RFID controller 120, which controls operation of various components of interrogator 110, such as transmitter 130 and receiver 140. Controller 120 may be configured to select an operating mode of the interrogator 110, determine an output power level of transmitted RF signals, decode data transmissions received from the RFID tags 160, and perform other functions known to those of ordinary skill in the art. In one example embodiment, controller 120 may be implemented as a 8-bit PIC® programmable microcontroller (available from Microchip Technology, Inc. of Chandler, Ariz.). In alternative embodiments, controller 120 may be implemented at least in part with a general purpose microprocessor, a field programmable gate array, an application specific integrated circuit (ASIC) or the like.

In one example embodiment, controller 120 includes a processor 122 and a memory 124. Processor 122 may store and execute program logic for operating various components of the interrogator 110, decoding data transmissions received from various RFID tags 160, performing arithmetic and logic operations and other functions. The processor 122 is coupled to memory 124 (which may be implemented as on-board memory), which may be used to store executable program instructions and other data for use by processor 122 during decoding of RFID information. Memory 124 may include volatile or non-volatile program memory, such as ROM (Read Only Memory), PROM (Programmable Read Only Memory), EEPROM (Electrically Erasable Programmable Read Only Memory), FLASH memory, and other types of magnetic and optical storage media for storing RFID information and other data.

In one example embodiment, interrogator 110 includes a RF transmitter 130, which is operable to receive digital data from processor 122, modulate the receive data using modulator 132, amplify the modulated signal using power amplifier 134 and route the amplified RF signal to antenna 150. Modulator 132 may be configured to receive a data bit sequence from processor 122 and modulate a receive bit sequence on a carrier signal. The carrier signal may be generated by an oscillator (not shown) and have 13.56 MHz frequence in compliance with ISO/IEC 14443 standard for contactless IC cards. Other frequencies may be used, if desired. Modulator 132 may be configured to use one or more of the various known signal modulation techniques, including amplitude modulation (such as Manchester or QAM (Quadrature Amplitude Modulation) modulation), frequency modulation (such as FSK (Frequency-Shift Keying) modulation), or phase modulation (such as PSK (Phase-Shift Keying) modulation) and variants thereof.

RF transmitter 130 may further include a power amplifier 134 for amplifying a modulated data signal and routing it to the antenna 150, which radiates the amplified signal to proximate RFID tags. In one example embodiment, controller 120 may control an output power level of amplifier 134. To that end, power amplifier 134 may be implemented as a multi-stage variable power amplifier, which may (in response to a control signal from RFID controller 120) increase/decrease its output power level by turning on/off one or more of its amplification stages. In alternative embodiments, the transmitter 130 may use other variable-power amplification techniques known to those of skill in the art. In one example embodiment, amplifier 134 may vary its output power level from 3.5 A/m to 12.5 A/m in 0.5 A/m increments. The desired output power range may be selected based on specific power requirements of one or more RFID tags.

In one example embodiment, interrogator 110 includes an RF receiver 140, which is configured to receive data transmissions from antenna 150, demodulate the received data using demodulator 142, amplify the demodulated digital data signal using power amplifier 144 and route the amplified signal to processor 122 for decoding. To demodulate a signal, demodulator 132 may use a PLL (Phase Lock Loop) (not shown) and a reference signal generated by an oscillator (not shown) to synchronise itself with the incoming data transmission and extract a digital data signal from the carrier signal. Furthermore, demodulator 132 needs to know the modulation type of the incoming data transmission, which, in most cases, will be identical to the modulation type used by the transmitter 132. The demodulated data signal is amplified and routed to processor 122.

In one example embodiment, interrogator 110 includes one or more RF antennas 150 for transmitting and receiving RF signals. In one example embodiment, antenna 150 may be implemented as a single mono-static RF antenna, which may transmit a signal coming from transmitter 130 as well as receive a signal coming from an RFID tag 160.

Switching between transmitting and receiving modes may require use of a circulator (not shown) that multiplexes the received and transmitted signals through a single port. In another example embodiment, antenna 150 may be implemented as a bi-static antenna, including two antennas, where one antenna is dedicated to transmitting, and the other antenna is dedicated to receiving. Use of bi-static antenna improves sensitivity of antenna 150, whereby improving performance of interrogator 110.

In one example embodiment, RFID interrogator 110 has two operating modes: reader talk first (RTF) mode and tag talk first (TTF) mode. In the RTF mode, the interrogator 110 initiates a communication session with an RFID tag by transmitting a polling signal, which may be detected by RTF tags 160 located in the proximity of interrogator 110. RFID tag 160 may process the received polling signal and respond to the interrogator 110 with a response data transmission. In the TTF mode, an RFID tag 160 initiates a communication session when placed in proximity of interrogator 110 by either sending a beacon signal or starting the actual data transmission. In this mode, interrogator 110 listens for any signals detected at the receiver 140. When a data transmission is detected from a TTF tag 160, interrogator 110 attempts to decode it using methods described hereinbelow. The interrogator 110 may periodically alternate between the two operating modes, thereby managing to read different types of RFID tags.

In one example embodiment, interrogator 110 may use different methods for decoding RTF and TTF data transmissions. RTF transmissions may be decoded in real-time, because interrogator 110 may know the format of the data transmission in advance. In particular, an RTF data transmission is send by the RTF tag 160 in response to a polling signal transmitted by the interrogator 110. The polling signal may contain information about communication protocol utilized by the interrogator 110, such as a version number of the communication protocol, vendor information, data format information and the like. In this way, the RTF tag knows how to format its response data transmission, so it can be decoded by interrogator 110 on the fly. In contrast, TTF transmissions are initiated by RFID tags 160 and thus cannot be decoded in real-time because the format of the data transmission is not known to interrogator 110 in advance. To that end, the interrogator 110 stores the entire TTF data transmission in memory 124 and only then begins decoding of the stored data transmission, as discussed herein below.

Figure 2:
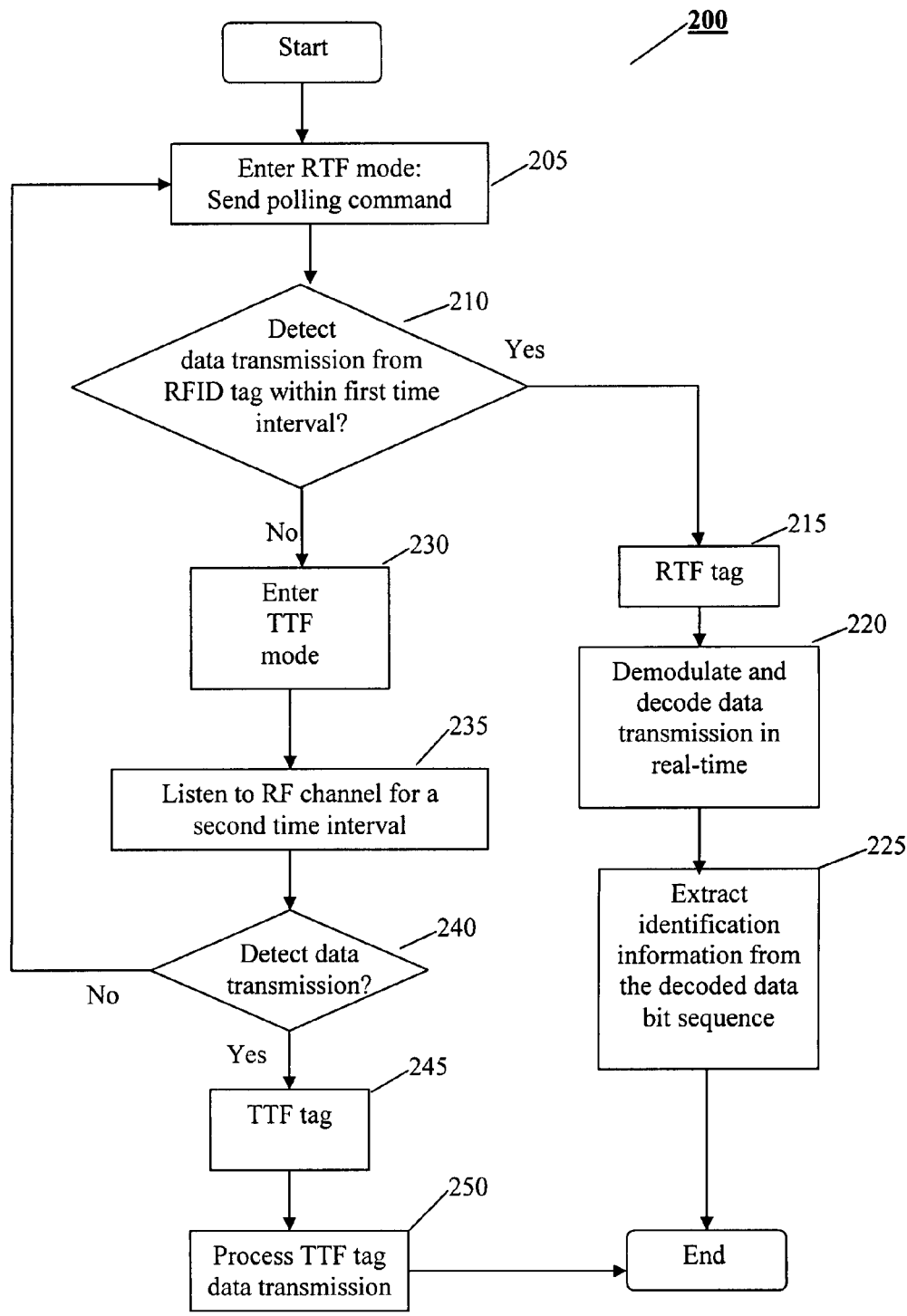
FIG. 2 is a flow diagram illustrating an example embodiment of an RFID interrogation process.

Turning now to FIG. 2, an example embodiment of an RFID interrogation process 200 is illustrated in a flow diagram. At step 205, RFID interrogator enters RTF mode and sends a polling command. At step 210, the interrogator listens to a channel for a first predetermined period of time, which is sufficiently long to receive a response from a RTF tag located in the proximity of the RFID interrogator. Such period of time is commonly referred to as a frame delay time and it may vary between different communication standards. The International Standards Organization (ISO) has adopted standard ISO/IEC 14443-1:2000 entitled "Identification cards—Contactless integrated circuit(s) cards—Proximity cards" as amended by ISO/IEC 1443-2:2001, ISO/IEC 14443-3:2001 and ISO/IEC 14443-4:2001. In accordance with that standard, which applies to many IC cards in use today, the ISO/IEC 14443 standard frame delay time is set to 91.1 microseconds. If a data transmission is received within the predetermined period of time, the RFID interrogator concludes that it comes in response to the polling command from a proximate RTF RFID tag, step 215. The interrogator then demodulates, amplifies and decodes in real time the data transmission being received, step 220. The processor then extract identification information from the decoded bit sequence for further processing, step 225.

If no data transmission was received in the first predetermined time period, step 210, the RFID interrogator enters TTF mode, step 230. In the TTF mode, the interrogator listens to a channel for a second predetermined period of time, which may be arbitrarily selected by a system administrator. In one example embodiment, the TTF mode may last for 300 milliseconds, step 235. If no data transmission was received during the second predetermined time period, the RFID interrogator may switch back to the RTF mode, described above. If data transmission is detected during the second time period, the interrogator concludes that the data transmission is coming from TTF RFID tag, step 245. The interrogator then demodulates the received data transmission and stores it in memory for further processing using algorithms described hereinbelow, step 250.

In the TTF mode, RFID interrogator 110 is configured to interrogate RFID tags 160 that use one or more variations of the ISO/IEC 14443 standard for contactless IC cards. Depending on the variation used by RFID tag 160, the data transmitted by the tag 160 may be formatted to contain one or more start bits (S), one or more data bits (D), odd (O) or event (E) parity bits and cyclic redundancy check (CRC) bits (C). Below are several examples of bit sequences that interrogator 110 may be able to decode:

S DDDDDDDO DDDDDDDO CCCCCCCO CCCCCCCO (standard ISO/IEC 14443-A bit steam)

DDDDDDDD DDDDDDDD (no start bit, no parity bits, no CRC)

DDDDDDDD DDDDDDDD CCCCCCCC CCCCCCCC (no start bit, no parity bits, CRC)

S DDDDDDDO DDDDDDDO (start bit, odd parity bits, no CRC)

S DDDDDDDE DDDDDDDE (start bit, even parity bits, no CRC)

S DDDDDDDE DDDDDDDE CCCCCCCE CCCCCCCE (start bit, even parity bits, and CRC)

In order to decode these and other bit sequences, the RFID interrogator may use the following decoding algorithm: First, RFID interrogator counts the number of bits in the received bit sequence to see if there is a start bit or not. Second, the interrogator checks each byte to see if there is even, odd or no parity bits. Third, the interrogator checks for the presence of a 16 bit CRC sequence. Once all of these parameters are determined the data is output in the corresponding format. This allows the interrogator to read tags that are fully ISO/EEC 14443 compliant as well as RFID tags that use a TTF variant of the ISO/IEC 14443 communication standard. Each of the above data processing steps will be described in a greater detail hereinbelow with reference to FIGS. 3-5.

Figure 3:
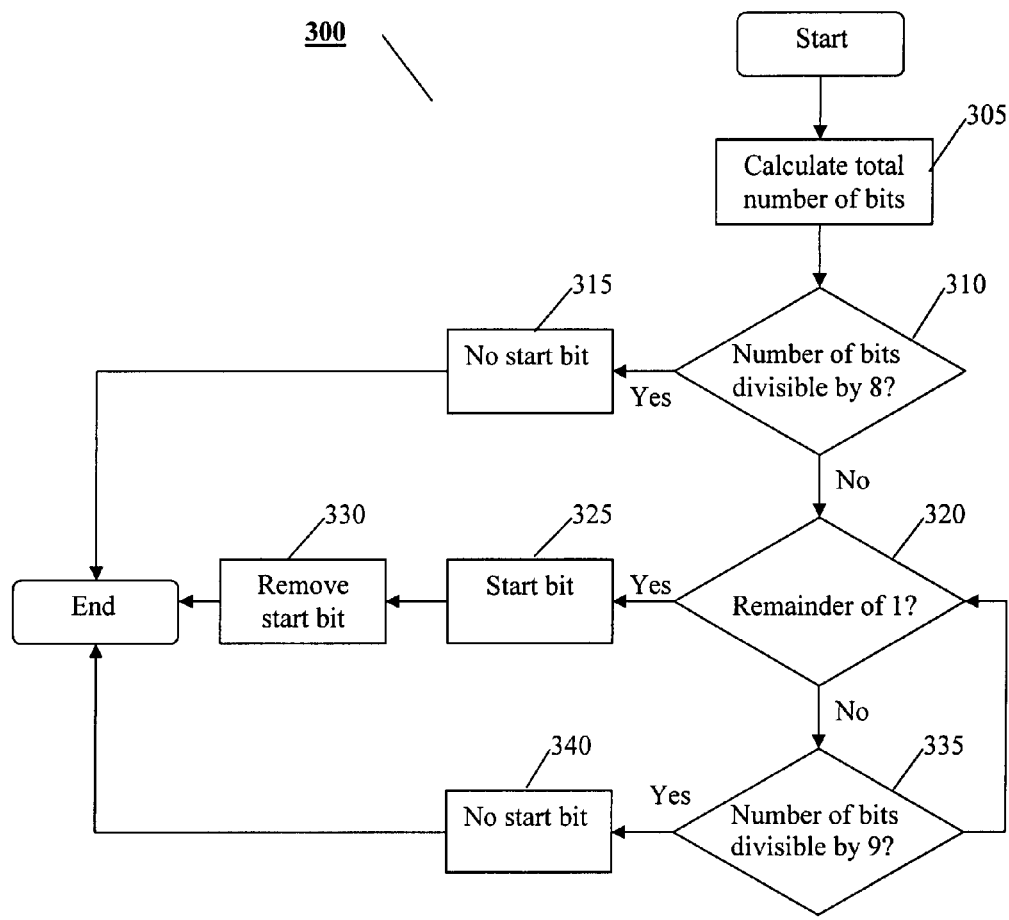
FIGS. 3-5 are flow diagrams illustrating example embodiments of data decoding processes.

Turning now to FIG. 3, an example embodiment of a process 300 for determining the presence of one or more start bits in the RFID data transmission is illustrated in flow diagram form. At step 305, a processor in the RFID interrogator calculates the total number of bits in the received data transmission. The processor then determines if the total number of bits in the data transmission is divisible by 8 without remainder, step 310. If the total number of bits is divisible by eight without remainder, the processor concludes that there is no start bit in the data transmission, step 315. If the total number of bits is divisible by eight with remainder of 1, step 320, the processor concludes that there is a start bit, step 325, and it is removed from the bit sequence, step 330. If the total number of bits is not evenly divisible by eight, step 302, the processor then checks if the total number of bits is evenly divisible by 9, step 335. If the total number of bits is divisible by nine without remainder, the processor concludes that there is no start bit in the data transmission, step 340. If the total number of bits is divisible by nine with remainder of one, step 320, the processor concludes that there is a start bit, step 325, and it is removed, step 330.

The table below illustrates examples of operation of the algorithm of FIG. 3.

| Number of bits | Divisible by 8? | Divisible by 9? | Remainder of 1? | Conclusion |
| --- | --- | --- | --- | --- |
| 37 | No | No | Yes when divided by 9 | Start bit |
| 36 | No | Yes | Don't care | No start bit |
| 32 | Yes | No | Don't care | No start bit |
| 35 | No | No | No | Erroneous |
| 33 | No | No | Yes when divided by 8 | Start bit |

The following are two examples of operation of the algorithm of FIG. 3.

S DDDDDDDO DDDDDDDO CCCCCCCO CCCCCCCO

Total number of bits received is 37, which does not divide evenly by 8 or by 9. When divided by 9 there is a remainder of 1, therefore the first bit is a start bit.

DDDDDDDO DDDDDDDO CCCCCCCO CCCCCCCO

Total number of bits received is 36, which divides evenly by 9, thus there is no start bit.

Figure 4:
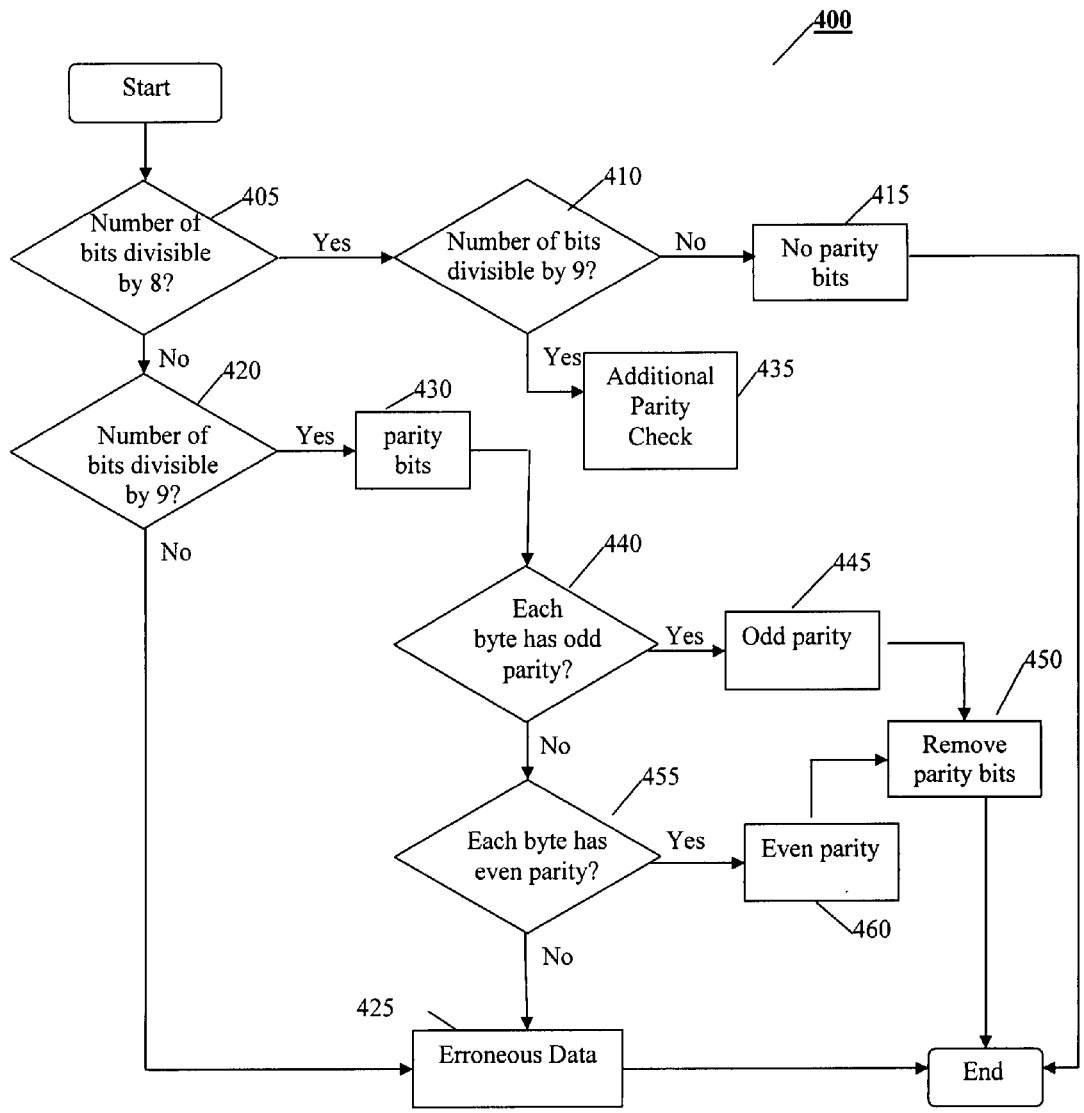

Once the start bit is removed from the bit sequence, the processor may check parity of the data transmission. FIG. 4 shows an example embodiment of a process 400 for determining the parity of the data transmission. For the parity check the number of bits (minus the start bits) is divided by 8 and by 9. If the number of bits divides evenly by 8 and not by 9, steps 405 and 410, the processor concludes that there is no parity, step 415. If the number of bits divides evenly by 9 and not by 8, steps 405 and 420, the processor concludes that there is parity, step 430. If the number of bits divides evenly by 8 and by 9, step 405 and 410, the processor may do additional checking, step 435, as described in the examples below. If the number of bits does not divide evenly by 8 or 9, steps 405 and 420, the data is erroneous, step 425, and may be discarded.

If parity is found, the processor may then check if it is even or odd. In order to do that, the processor checks each byte to see what parity is used. If all bytes use odd parity bits, step 440, the parity is set to odd, step 445, and the parity bits may be removed from the bit sequence, step 450. If all bytes use even parity bits, step 455, the parity is set to even, step 460, and the parity bits may be removed from the bit sequences, step 450. If there is a mix of even and odd parity bits, then the processor concludes that there are one or more bit errors and the data sequence may be discarded, step 425.

The table below illustrates examples of operation of the process of FIG. 4.

| Number of bits | Divisible by 8? | Divisible by 9? | Conclusion |
| --- | --- | --- | --- |
| 36 | No | Yes | Has parity bits |
| 32 | Yes | No | No parity bits |
| 72 | Yes | Yes | Additional check needed to determine if there are parity bits |
| 37 | No | No | Erroneous |

The following are three examples of operation of the process of FIG. 4.

DDDDDDDO DDDDDDDO CCCCCCCO CCCCCCCO
Total number of bits received is 36, which divides evenly by 9 and not by 8, so the processor determines that there is parity. The processor may then check the bit sequence and find all bytes that use odd parity, so that parity is set to odd.

DDDDDDDD DDDDDDDD CCCCCCCC CCCCCCCC
Total number of bits received is 32, which divides evenly by 8 and not by 9, so the processor determines that there is no parity.

DDDDDDDO DDDDDDDO DDDDDDDO DDDDDDDO
DDDDDDDO DDDDDDDO CCCCCCCO CCCCCCCO
Total number of bits received is 72, which divides evenly by 8 and by 9, so the processor must take every ninth bit of the bit sequence and check it for even and odd parity. In this case every $9^{th}$ bit is found to be an odd parity bit, thus the parity is set to odd.

Figure 5:
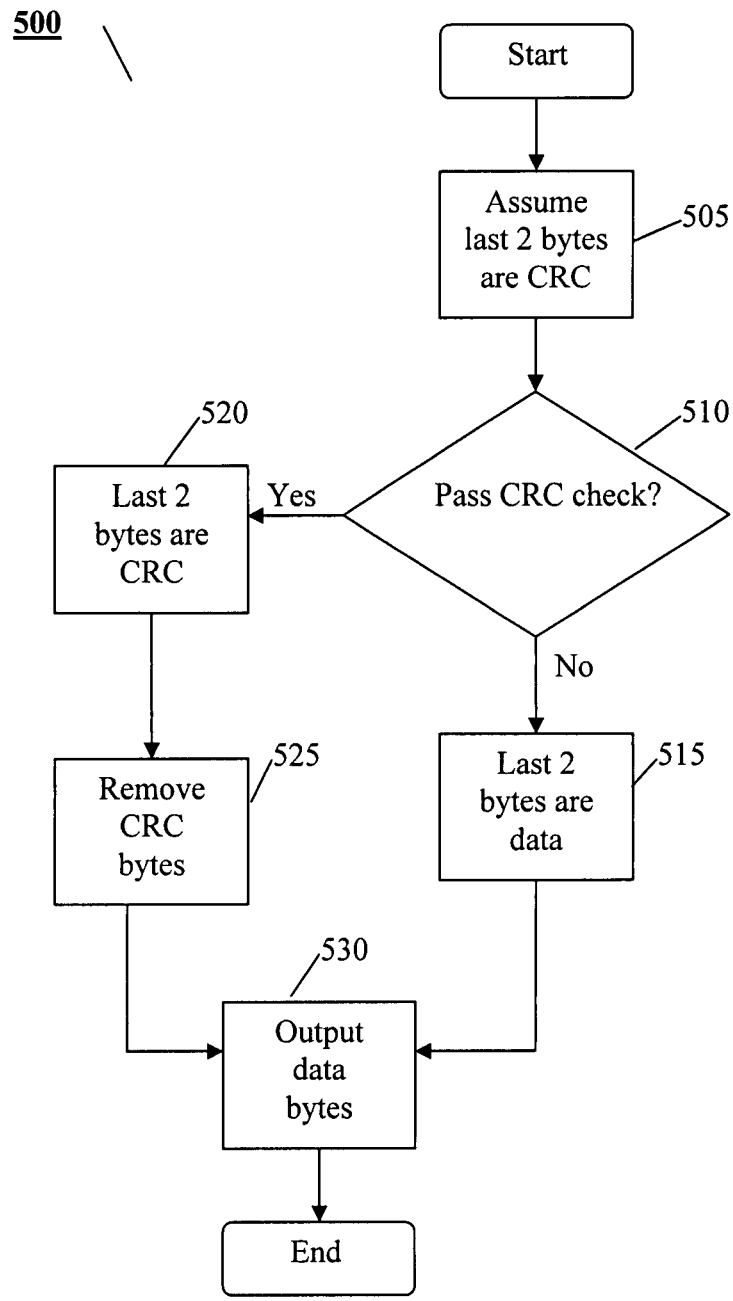

Once one or more parity bits are removed, the processor may determine whether the data transmission includes one or more cyclic redundancy check (CRC) bits. FIG. 5 illustrates an example embodiment of a process 500 for performing a cyclic redundancy check. At step 505, the processor makes an assumption that last 2 bytes of the data transmission are CRC bytes until proven otherwise. The processor then performs a CRC check using methods known to those skilled in the art, step 510. If the CRC completes successfully, then the last 2 bytes are considered to be CRC bytes, step 520. The processor removes the CRC bytes, step 525, and outputs the remaining data bytes containing identification information, step 530. If the CRC does not check out, then the last 2 bytes are considered to be data bytes, step 515, and the processor outputs the remaining data bytes containing identification information, step 530.

The following are two examples of operation of the algorithm of FIG. 5.

DDDDDDDD DDDDDDDD CCCCCCCC CCCCCCCC
The last 2 bytes are assumed to be CRC bytes and a CRC calculation is done. In this case the CRC passes.

DDDDDDDD DDDDDDDD DDDDDDDD DDDDDDDD
The last 2 bytes are assumed to be CRC bytes and a CRC calculation is done. In this case the CRC will fail and the last 2 bytes are taken as data bytes.

In one example embodiment, various operating modes of interrogator 110 may be configured using a computer program executable on personal computer (not depicted in FIG. 1). A computer may be connected to the interrogator 110 via a communication interface (not depicted in FIG. 1), such as a parallel port, serial port or network card. The computer program may include instructions for generating a user interface for selecting an operating mode of interrogator 110. In one embodiment, interrogator 110 a user may set the interrogator into RTF operating mode in which the interrogator initiates communications with proximate RFID tags by periodically transmitting IC card polling signal. In another embodiment, interrogator 110 may be set into TTF operating mode in which the interrogator listens for communications initiated by proximate RFID tag. Yet in another embodiment, interrogator 110 may be set into a mixed operating mode in which the interrogator periodically alternates between the RTF and TTF cycles. The computer program may also allow the use to set duration of the RFT and TTF cycles.

In one example embodiment, the computer program may also retrieve from interrogator 110 information communicated by RFID tags. For example, the computer program may retrieve decoded identification information received from RFID tags. In another example, the computer program may retrieve undecoded bit sequence from the interrogator and perform one or more decoding and error checking processes on the received data using algorithms described herein. The computer program may also run various decryption algorithms on encrypted identification data. Note that cryptographic encoding of identification data stored on the RFID may be used in accordance with any of the known standards, and processes available to those of skill in the art. The computer program may then display the retrieved identification information in human-readable form. The computer program may also collect statistical information on the read RFID tags, which may be used to optimize operation of the interrogator 110.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for communicating with a contactless IC card, the method comprising:
   transmitting an integrated circuit (IC) card polling signal;
   receiving a data transmission from an IC card;
   determining whether or not the data transmission is being received from the IC card in response to the polling signal;
   decoding in real-time the data transmission being received when the data transmission is being received in response to the polling signal;
   storing the entire received data transmission in a memory when the data transmission is not received in response to the polling signal; and responsive to the entire received data transmission being stored in the memory, decoding the stored data transmission including determining a format of the stored data transmission that includes determining whether the data transmission includes one or more start bits by determining a total number of bits in the data transmission and determining whether the total number of bits in the data transmission is divisible without remainder by at least a first integer.

2. The method of claim 1, wherein determining whether or not the data transmission is being received in response to the polling signal comprises determining whether the data transmission being received before or after expiration of a first time period following the transmission of the polling signal.

3. The method of claim 2, wherein decoding the data transmission stored in the memory including determining the format of the stored data transmission includes:
  determining whether the data transmission includes one or more parity bits; and
  determining whether the data transmission includes one or more cyclic redundancy check (CRC) bits.

4. The method of claim 3, wherein determining whether the data transmission includes one or more start bits includes:
  determining whether the total number of bits in the data transmission is divisible without remainder by a second integer.

5. The method of claim 4, further comprising:
  removing the one or more start bits from the data transmission.

6. The method of claim 5, wherein determining whether the data transmission includes one or more parity bits includes:
  determining whether the total number of bits in the data transmission, without the one or more start bits, is divisible without a remainder by at least one of the first integer and the second integer.

7. The method of claim 6, further comprising:
  determining, based on values of one or more parity bits, a parity of the data transmission, the parity including one of even parity and odd parity;
  detecting an error in the data transmission, based on the parity of the data transmission and the values of the one or more parity bits in the data transmission; and
  removing the one or more parity bits from the data transmission when no error in the data transmission is detected.

8. The method of claim 7, wherein determining whether the data transmission includes one or more CRC bits includes:
  performing a cyclic redundancy check (CRC) of the data transmission; and
  removing the CRC bits from the data transmission when the cyclic redundancy check is completed.

9. The method of claim 8, wherein the first integer is eight and the second integer is nine.

10. The method of claim 9, further comprising:
  retransmitting the polling signal after expiration of a second time period, the second time period being longer than the first time period.

11. A system for communicating with a contactless integrated circuit (IC) card, comprising:
  a transmitter configured to transmit an IC card polling signal;
  a receiver configured to detect a data transmission from an IC card;
  a memory configured to store the detected data transmission; and
  a processor configured to
    determine whether or not the data transmission is being received from the IC card in response to the polling signal;
    decode in real-time the data transmission being received when the data transmission is being received in response to the polling signal;
    store the entire received data transmission in a memory when the data transmission is not received in response to the polling signal; and
    responsive to the entire received data transmission being stored in the memory, decode the stored data transmission to determine a format of the stored data transmission, wherein to decode the stored data transmission to determine the format of the stored data transmission the processor is further configured to determine whether the data transmission includes one or more start bits by determining a total number of bits in the data transmission and determine by determining whether the total number of bits in the data transmission is divisible without remainder by at least a first integer.

12. The system of claim 11, wherein to determine whether or not the data transmission is being received in response to the polling signal, the processor is configured to determine whether the data transmission is being received before or after expiration of a first time period following the transmission of the polling signal.

13. The system of claim 12, wherein to decode the stored data transmission to determine a format of the data transmission the processor is further configured
  to determine whether the data transmission includes one or more parity bits; and
  to determine whether the data transmission includes one or more cyclic redundancy check (CRC) bits.

14. The system of claim 13, wherein to determine whether the data transmission includes one or more start bits, the processor is further configured:
  to determine whether the total number of bits in the data transmission is divisible without remainder by a second integer.

15. The system of claim 14, wherein the processor is further configured to remove the one or more start bits from the data transmission.

16. The system of claim 15, wherein to determine whether the data transmission includes one or more parity bits, the processor is further configured to determine whether the total number of bits in the data transmission, without the one or more start bits, is divisible without a remainder by at least one of the first integer and the second integer.

17. The system of claim 16, wherein the process is further configured to determine, based on values of one or more parity bits, a parity of the data transmission, the parity including one of even parity and odd parity.

18. The system of claim 17, wherein the processor is further configured:
  to detect an error in the data transmission, based on the parity of the data transmission and the values of the one or more parity bits in the data transmission; and
  to remove the one or more parity bits from the data transmission when no error in the data transmission is detected.

19. The system of claim 17, wherein to determine whether the data transmission includes one or more CRC bits, the processor is further configured:
  to perform a cyclic redundancy check (CRC) of the data transmission; and to remove the one or more CRC bits from the data transmission when the cyclic redundancy check is completed.

20. The system of claim 19, wherein the first integer is eight and the second integer is nine.

21. The system of claim 11, wherein the memory includes one of a memory buffer and a random access memory.

22. The system of claim 11, wherein the processor includes at least one of a general purpose microprocessor, a microcontroller, a field programmable gate array and an application specific integrated circuit (ASIC).

23. The system of claim 11, wherein the contactless IC card includes an RFID card.

24. A programmable integrated circuit (IC) device for facilitating communication with a contactless IC card, the IC device comprising program logic for:
    generating a bit sequence for transmission as a polling signal to an IC card;
    receiving a bit sequence generated from a data transmission from an IC card;
    determining whether or not the data transmission is being received in response to the polling signal;
    decoding in real-time the bit sequence being received when the data transmission is being received in response to the polling signal;
    storing the entire received bit sequence in a memory when the data transmission is not received in response to the polling signal; and
    responsive to the entire received bit sequence being stored in the memory, the programmable IC device further including program logic for decoding the stored bit sequence that includes determining whether the data transmission includes one or more start bits by determining a total number of bits in the data transmission and determining whether the total number of bits in the data transmission is divisible without remainder by at least a first integer.

25. The programmable IC device of claim 24, wherein to determine whether or not the data transmission is being received in response to the polling signal, the programmable IC device includes program logic for determining whether the data transmission being received before or after expiration of a first time period following transmission of the polling signal.

26. The programmable IC device of claim 25, wherein to decode the bit sequence stored in the memory, the programmable IC device includes program logic for determining format of the bit sequence, including program logic for:
    determining whether the bit sequence includes one or more parity bits; and
    determining whether the bit sequence includes one or more CRC bits.

27. The programmable IC device of claim 26, wherein the programmable IC device includes at least one of a general purpose microprocessor, a microcontroller, a field programmable gate array, and an application specific integrated circuit (ASIC).

28. The programmable IC device of claim 27, wherein the contactless IC card includes an RFID card.

29. A non-transitory computer-readable medium comprising computer-executable instructions for configuring operation of a contactless integrated circuit (IC) card interrogator, comprising instructions for selecting an operating mode of the IC card interrogator, wherein the operating mode is selected from a group of operating modes including:
    a first operating mode, wherein the IC card interrogator initiates communication with proximate IC cards by periodically transmitting an IC card polling signal;
    a second operating mode, wherein an IC card interrogator listens for communications initiated by proximate IC cards;
    a third operating mode, wherein the IC card interrogator periodically alternates between the first operating mode and the second operating mode; and further comprising:
    instructions for storing the entire communications received from a proximate IC card in memory when the communications are not being received in response to the IC card polling signal; and
    instructions for decoding the stored data transmission including determining a format of the stored data transmission responsive to the entire communications received being stored in the memory that includes determining whether the stored data transmission includes one or more start bits by determining a total number of bits in the stored data transmission and determining whether the total number of bits in the stored data transmission is divisible without remainder by at least a first integer.

30. The computer-readable medium of claim 29, further comprising instructions for configuring duration of the first operating mode and duration of the second operating mode when the third operating mode is selected.

31. The computer-readable medium of claim 30, further comprising instructions for
    retrieving from the interrogator information communicated by an IC card; and
    displaying the retrieved information in human-readable form.

32. The computer-readable medium of claim 30, further comprising instructions for
    retrieving from the interrogator information communicated by an IC card; and
    displaying the decoded information in human-readable form.

* * * * *